(No Model.) 2 Sheets—Sheet 1.
M. GUETT.
ELECTRIC SWITCH.
No. 594,618. Patented Nov. 30, 1897.
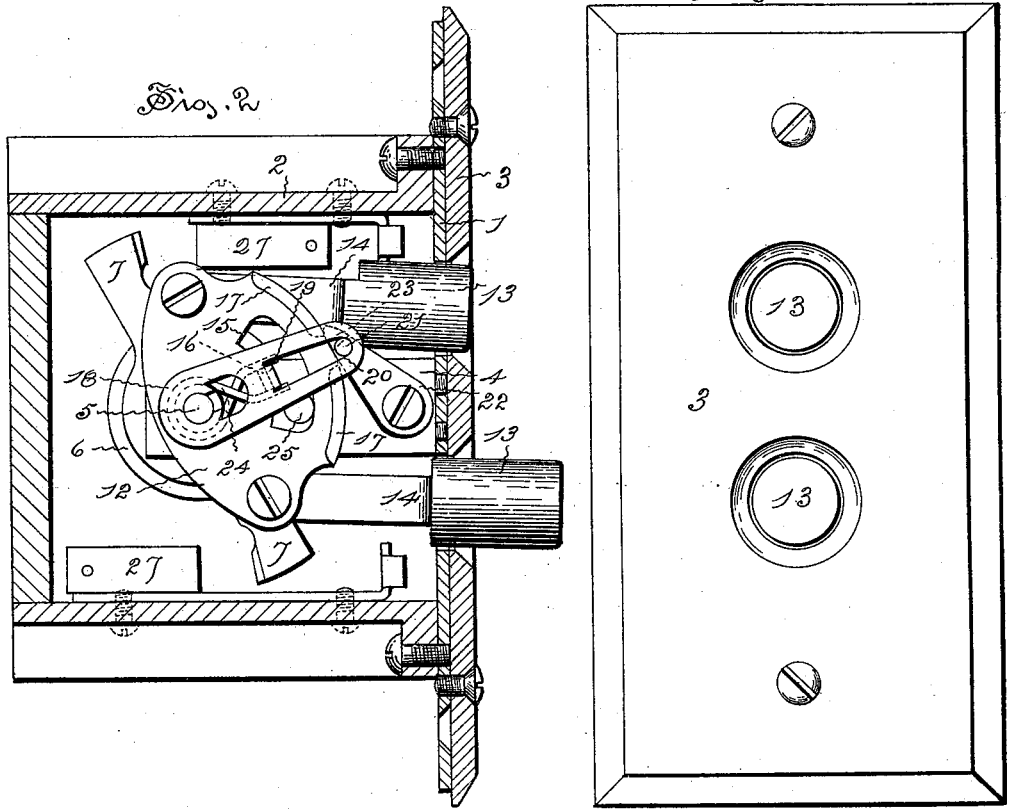
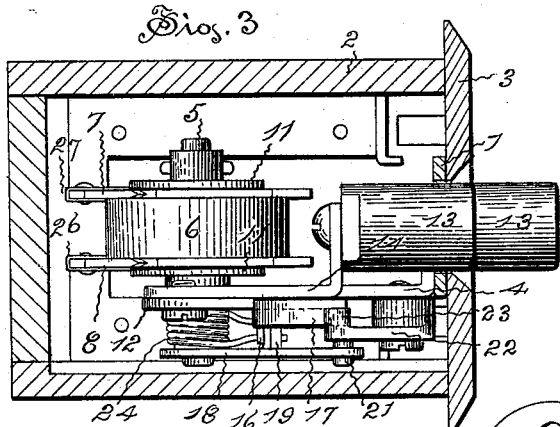
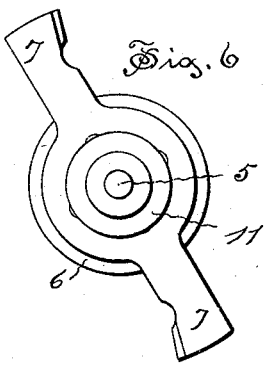
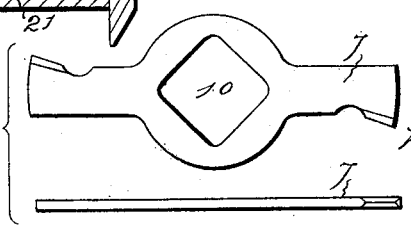

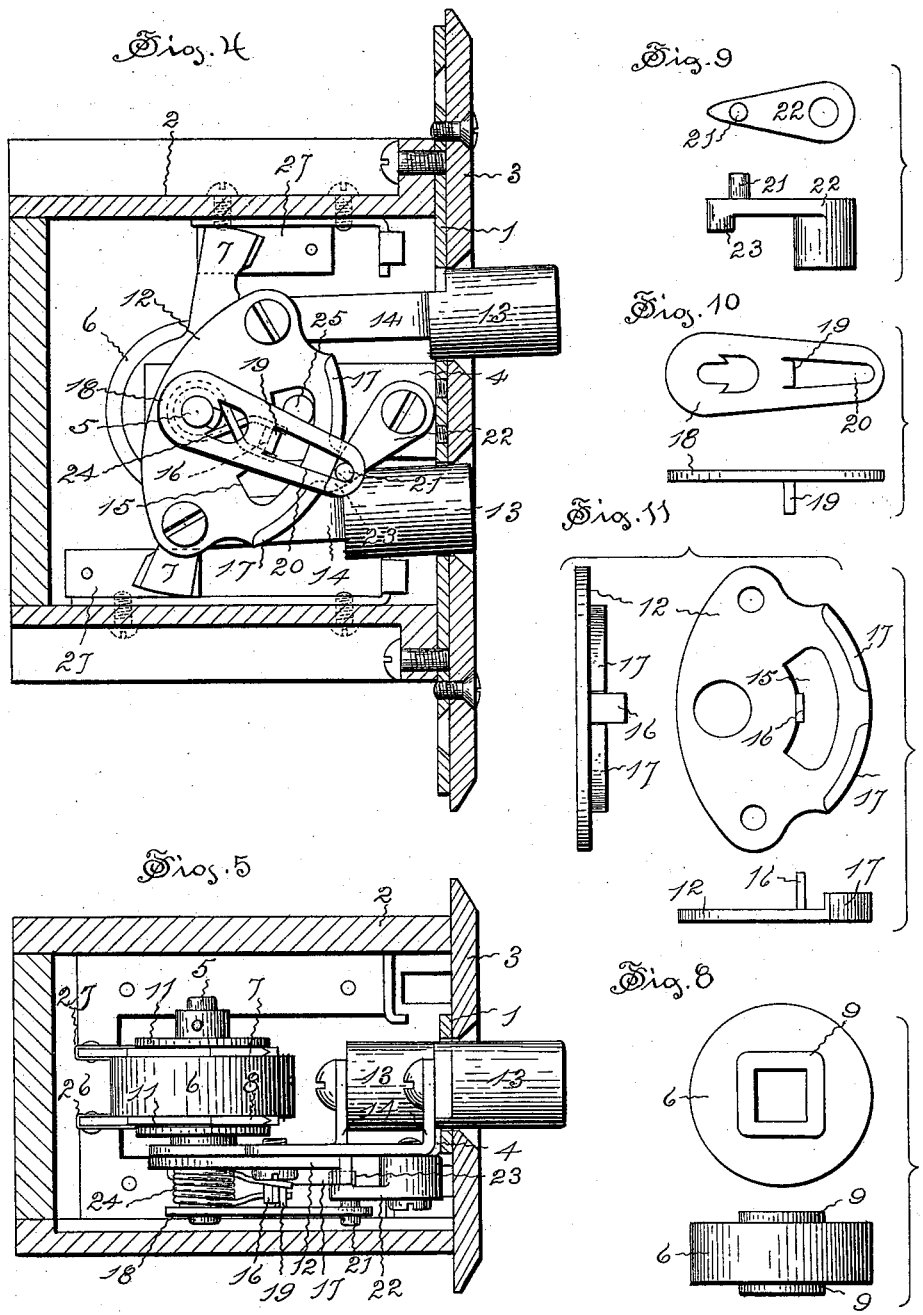

UNITED STATES PATENT OFFICE.

MONROE GUETT, OF HARTFORD, CONNECTICUT, ASSIGNOR TO THE HART & HEGEMAN MANUFACTURING COMPANY, OF SAME PLACE.

ELECTRIC SWITCH.

SPECIFICATION forming part of Letters Patent No. 594,618, dated November 30, 1897.

Application filed May 29, 1897. Serial No. 638,750. (No model.)

*To all whom it may concern:*

Be it known that I, MONROE GUETT, a citizen of the United States, residing at Hartford, in the county of Hartford and State of Connecticut, have invented certain new and useful Improvements in Electric Switches, of which the following is a specification.

The invention relates to oscillating snap-switches, and although the embodiment of the invention illustrated and described herein is provided with push-buttons for giving the impulse-spring the required tension for oscillating the poles to open and close the electric circuit the mechanism of the invention is equally applicable to a switch in which such movement of the poles is given by a spring made tense by a lever or by a turn-button handle.

The object of the invention is to provide a simple and inexpensive switch of this nature which is so constructed that the poles can without particular effort be snapped suddenly and forcibly to cause a sure and close connection with the stationary conducting-contacts and to cause a sudden and extended disruption of the circuit.

This switch can be made so that it may be used in heat and power circuits; but it is particularly adapted to ordinary light-circuits. Therefore it is illustrated and described with reference to the last-mentioned use.

Of the accompanying drawings, Figure 1 shows a face view of a push-button switch that embodies the invention. Fig. 2 is a side elevation with the plate and case in central section, showing the switch with the poles in the positions occupied when the circuit is open. Fig. 3 is a view with the plate and case in central section, looking from the top of Fig. 2. Fig. 4 is a side elevation with the plate and case in central section, showing the switch with the poles in the positions occupied when the circuit is closed. Fig. 5 is a view with the plate and case in section, looking from the top of Fig. 4. Fig. 6 is a plan of the block bearing the movable poles. Fig. 7 shows a plan and an edge view of the poles detached. Fig. 8 shows a plan and an edge view of the pole-block. Fig. 9 shows a plan and an edge view of the locking-lever. Fig. 10 shows a plan and an edge view of the spindle crank-arm, and Fig. 11 shows a plan and an edge view of the oscillating locking-plate.

In the views, 1 indicates the base-plate, which supports the mechanism and is adapted to be attached to the wall of the apartment in which the switch is to be used. A shell or case 2, preferably formed of porcelain, for protecting the mechanism is connected with one side of this base-plate, and over the other side is placed an ornamental face-plate 3. Secured to the base is a supporting-arm 4, and held in a perforation in the end of this arm is a spindle 5. Mounted upon the spindle is the pole-block 6, which bears the pole-pieces 7 and 8. The block 6 is formed of insulating material with a rectangular opening through it, and this opening fits a correspondingly-shaped part of the spindle or a bushing placed upon the spindle, so that the block will rotate with the spindle. The block shown has a hub 9 on each face, and the pole-pieces each have a rectangular opening 10, adapted to loosely fit over a hub 9. The pole-pieces are loosely retained in position on the hubs by collars 11, secured to the spindle or to a bushing on the spindle. Pole-pieces arranged in this manner have a slight sidewise movement longitudinally of the spindle to allow them to properly adjust themselves and pass freely into and out of the stationary contacts as they rotate with the spindle.

Loosely mounted upon the spindle is a locking-plate 12. This plate is formed to oscillate as moved by the handles of the switch, which in the instance shown are the push-buttons 13. The push-buttons reciprocate through perforations in the base-plate 1 and face-plate 3 and are loosely joined with the plate 12 by bars 14. The plate 12 has an opening 15, an outwardly-projecting lug 16, and an outwardly-projecting wall 17, which is arranged on the arc of a circle the center of which is the axis of the spindle. This wall has an opening near the middle of its length.

Firmly connected with the spindle is a crank-arm 18. This crank-arm has an inwardly-projecting lug 19 and a slot 20 for a stud 21, that projects outwardly from the lever 22, which is pivotally supported by the arm 4 and that has an inwardly-projecting lug 23, adapted to engage the face of the wall 17.

Coiled about the spindle is a spring 24. The ends of this spring project on each side of and engage with the edges of the lug 16 on the locking-plate 12 and the lug 19 on the crank-arm 18, which lugs in their normal positions stand face to face.

A guiding-stud 25 may be secured to the supporting-arm 4 so as to project into the opening 15 and aid in guiding and limiting the movement of the plate 12.

Attached to the walls of the shell or case are stationary conducting-contacts 26 and 27. These contacts are arranged in pairs, and the pole-pieces pass between the pairs, as in a knife-switch, the poles 7 passing into and out of the pairs of contacts 27 and the poles 8 passing into and out of the pairs of contacts 26 in opening and closing the circuit.

When the plate 12 is oscillated, either by pressing one of the push-buttons or by swinging a lever-handle or by rotating a turned-button handle, the lug 16, projecting from the plate, moves one end of the impulse-spring, so as to place the spring under tension, for the other end of the spring is held from movement by the lug 19, projecting from the crank-arm. The crank-arm, although borne upon by the end of the spring, cannot move until sufficient tension is generated, as it is held by the stud 21, that projects from the lever 22 into the slot 20, which lever cannot move as long as the wall 17 on the plate 12 is in front of the lug 23. When the plate 12 is oscillated sufficiently to carry the wall 17 from in front of the lug 23, the lever is free to oscillate and allow the crank-arm to be turned by the now sufficiently-tense spring, for the lug 23 will pass around the inside of the wall 17 and swing back through the opening in the middle of the wall. When the lever oscillates, the lug 23 passes through the opening in the wall 17 into such position that the next time the plate is oscillated the lug again engages the wall 17 until the spring is under sufficient tension. The wall 17 is of such length that the lug 23 is not disengaged from the end until after the plate is oscillated slightly farther than it will normally stand when held by the ends of the impulse-spring—that is, the plate is oscillated a little beyond its normal position by the push of the handle—and then after the crank-arm and spindle, with the poles, have been oscillated and the fingers removed from the handle or push-button the plate moves backward slightly under the impulse of the end of the spring, so that the lug 23, projecting from the lever, will stand outside of the edge of the wall 17 in position to again lock the parts ready for the next movement.

The parts of this switch are simple to manufacture and can be readily assembled. The action of the mechanisms is smooth and easy. The movement of the poles is quick and strong. The make is sure and close. The break is sudden and extended, and there are a number of points of break, so as to insure sufficient disruption of the current to prevent any possibility of drawing and maintaining an arc.

I claim as my invention—

1. In an electric switch, in combination, a locking-plate arranged to be oscillated between two normal positions, means for oscillating the plate beyond those normal positions, a locking-lever loosely connected with the poles and arranged to engage a portion of the plate until it is oscillated beyond either one or the other of those normal positions, a spring engaging the plate and also a part connected with the poles and arranged to be put under tension by the oscillation of the plate, said spring when under tension being adapted to throw the poles and to move the plate to either one or the other of its normal positions, and poles mounted upon a spindle and adapted to be oscillated when the locking-lever moves, substantially as specified.

2. In an electric switch, in combination, an oscillating plate, means for oscillating the plate, a locking-lever adapted to engage a portion of the plate during a part of its oscillation, a crank-arm engaged by the locking-lever, a spindle connected with the crank-arm, poles mounted upon the spindle, and a spring arranged to engage the oscillating plate and also the crank-arm, substantially as specified.

3. In an electric switch, in combination, an oscillating plate with a wall projecting outwardly therefrom, means for oscillating the plate, a locking-lever with a part adapted to engage the projecting wall of the plate during a part of its oscillation, a crank-arm engaged by the locking-lever, a spindle connected with the crank-arm, poles mounted upon the spindle, and a spring arranged to engage with the oscillating plate and also with the crank-arm, substantially as specified.

4. In an electric switch, in combination, an oscillating plate with a wall projecting outwardly therefrom, said wall having an opening through it, means for oscillating the plate, a locking-lever having a lug adapted to engage the projecting wall of the plate during a part of its oscillation, a crank-arm engaged by a part of the locking-lever, a spindle connected with the crank-arm, poles mounted upon the spindle, and a spring arranged to engage a part connected with the oscillating plate, and also with a part connected with the crank-arm, substantially as specified.

5. In an electric switch, in combination, an oscillating plate with a wall projecting outwardly therefrom, said wall having an opening through it, means for oscillating the plate, a locking-lever having a lug adapted to engage the projecting wall of the plate during a part of its oscillation, a crank-arm having a slot engaged by a part of the locking-lever, a spindle connected with the crank-arm, poles mounted upon the spindle, and a spring arranged to engage a lug projecting from the crank-arm and also a lug projecting from the oscillating plate, substantially as specified.

6. In an electric switch, in combination, an oscillating plate with a wall projecting outwardly therefrom, said wall having an opening through it, means for oscillating the plate, a locking-lever having a lug adapted to engage the projecting wall of the plate during a part of its oscillation, a crank-arm having a slot engaged by a stud projecting from the locking-lever, a spindle connected with the crank-arm, a block of insulation borne by the spindle, poles loosely mounted upon the block, and a spring arranged to engage a part connected with the oscillating plate and also with a part connected with the crank-arm, substantially as specified.

7. In an electric switch, in combination, an oscillating plate, push-buttons connected with the oscillating plate, a locking-lever adapted to engage with the plate during a part of its oscillation, a crank-arm engaged by a locking-lever, a spindle connected with the crank-arm, poles mounted upon the spindle, and a spring arranged to engage with the oscillating plate and also with the crank-arm, substantially as specified.

8. In an electric switch, in combination, a block of insulating material firmly supported by a spindle, said block having angular hubs projecting from its opposite faces, means for rotating the block and spindle, poles projecting radially substantially in the plane of the block and loosely fitting the angular hubs of the block, and means for loosely retaining the pole-pieces upon the hubs so they rotate with but are movable sidewise independently of the block, substantially as specified.

9. In an electric switch, in combination with movable poles and a spring for throwing the poles, a locking-lever connected with the poles, an oscillating plate normally held by the spring in position to obstruct the movement of the lever, and means for making the spring tense and oscillating the plate out of the path of the lever so the spring can throw the poles, said spring and plate being so connected that the plate is moved by the spring backward in a direction opposite to its forward oscillation, to obstruct the lever after each movement of the lever and throw of the poles, substantially as specified.

10. In an electric switch, in combination with movable poles and a spring for throwing the poles, a locking-lever connected with the poles, an oscillating plate held by a spring in either one of two normal positions with a portion obstructing the movement of the lever, the obstructing portions of the plate being so arranged as to hold the lever until the plate is oscillated from one normal position beyond the other normal position, and means for oscillating the plate from one normal position beyond the other normal position so the spring can throw the poles, said spring returning the plate to the nearest normal position after each movement of the poles, substantially as specified.

MONROE GUETT.

Witnesses:
G. W. HART,
N. H. PEASH.